US012692165B2

(12) United States Patent
Jeong et al.

(10) Patent No.: US 12,692,165 B2
(45) Date of Patent: Jul. 28, 2026

(54) ACTIVATED CARBON AND METHOD FOR MANUFACTURING THE SAME

(71) Applicant: LG Energy Solution, Ltd., Seoul (KR)

(72) Inventors: Yochan Jeong, Daejeon (KR); Changhoon Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 703 days.

(21) Appl. No.: 17/928,594

(22) PCT Filed: Nov. 22, 2021

(86) PCT No.: PCT/KR2021/017143
§ 371 (c)(1),
(2) Date: Nov. 29, 2022

(87) PCT Pub. No.: WO2022/114694
PCT Pub. Date: Jun. 2, 2022

(65) Prior Publication Data
US 2023/0249977 A1 Aug. 10, 2023

(30) Foreign Application Priority Data

Nov. 25, 2020 (KR) ........................ 10-2020-0159437

(51) Int. Cl.
| | |
|---|---|
| *B01J 21/18* | (2006.01) |
| *C01B 32/168* | (2017.01) |
| *C01B 32/30* | (2017.01) |
| *C01B 32/312* | (2017.01) |
| *C01B 32/318* | (2017.01) |
| *C01B 32/336* | (2017.01) |

(52) U.S. Cl.
CPC .......... *C01B 32/336* (2017.08); *C01B 32/168* (2017.08); *C01B 32/318* (2017.08); *C01B 2202/04* (2013.01); *C01P 2002/02* (2013.01); *C01P 2002/82* (2013.01); *C01P 2004/03* (2013.01); *C01P 2004/04* (2013.01); *C01P 2006/12* (2013.01); *C01P 2006/14* (2013.01)

(58) Field of Classification Search
CPC ....... B01J 21/18; B01J 21/185; C01B 32/336; C01B 32/168; C01B 32/318; C01B 2202/04; C01B 2202/30; C01B 32/30; C01B 32/312; C01P 2002/02; C01P 2002/82; C01P 2004/03; C01P 2004/04; C01P 2006/12; C01P 2006/14; C01P 2004/60; Y02C 20/40
USPC .................................................. 502/182–185
See application file for complete search history.

(56) References Cited

U.S. PATENT DOCUMENTS

| | | | | | |
|---|---|---|---|---|---|
| 8,652,995 | B2 * | 2/2014 | Gadkaree | ............... | H01G 11/34 |
| | | | | | 502/437 |
| 8,709,972 | B2 * | 4/2014 | Istvan | ................... | C01B 32/336 |
| | | | | | 502/425 |
| 10,328,381 | B2 * | 6/2019 | Bae | .................... | B01J 20/28085 |
| 10,815,127 | B2 * | 10/2020 | Choi | ...................... | C01B 32/318 |
| 11,370,665 | B2 * | 6/2022 | Lou | ....................... | C01B 32/342 |
| 11,780,731 | B2 * | 10/2023 | Sakai | .................... | C01B 32/172 |
| | | | | | 428/367 |
| 2007/0054580 | A1 | 3/2007 | Sakurai et al. | | |
| 2010/0075835 | A1 | 3/2010 | Yuge et al. | | |
| 2013/0022532 | A1 * | 1/2013 | Gadkaree | ............... | H01G 11/44 |
| | | | | | 252/502 |
| 2013/0337303 | A1 | 12/2013 | Bhardwaj et al. | | |
| 2013/0337707 | A1 | 12/2013 | Hata et al. | | |
| 2016/0137504 | A1 * | 5/2016 | Hata | ........................ | H01B 1/04 |
| | | | | | 252/503 |
| 2017/0247258 | A1 * | 8/2017 | Bae | ........................ | C01B 32/342 |
| 2017/0282152 | A1 * | 10/2017 | Bae | .................... | B01D 53/0407 |
| 2018/0265666 | A1 | 9/2018 | Anzelmo et al. | | |
| 2019/0241437 | A1 | 8/2019 | Choi et al. | | |
| 2020/0231447 | A1 * | 7/2020 | Chang | ........................ | A23L 5/40 |
| 2020/0258651 | A1 * | 8/2020 | Yamashita | ............... | H01B 5/10 |
| 2020/0317528 | A1 * | 10/2020 | Seol | .................. | H01M 10/0525 |
| 2023/0271840 | A1 * | 8/2023 | Wu | ........................ | C25B 11/065 |
| | | | | | 429/480 |

FOREIGN PATENT DOCUMENTS

| | | |
|---|---|---|
| CN | 104692357 A | 6/2015 |
| CN | 110418816 | 5/2022 |
| JP | 2008-214824 A | 9/2008 |
| JP | 2011049067 | 3/2011 |
| JP | 2011105545 | 6/2011 |
| JP | 2015167941 | 9/2015 |
| JP | 2016059856 | 4/2016 |
| JP | 2016-088815 A | 5/2016 |

(Continued)

OTHER PUBLICATIONS

Lee, S. et al., "Effect of temperature on activated carbon nanotubes for hydrogen storage behaviors", International Journal of Hydrogen Energy, Elsevier, vol. 35, No. 13 (Jul. 1, 2010), pp. 6757-6762.
Marcos J. Prauchner et al., "Chemical versus physical activation of coconut shell: A comparative study", Microporous and Mesoporous Materials, vol. 152 (Apr. 1, 2012) pp. 163-171.
Jiacheng Wang et al., "KOH activation of carbon-based materials for energy storage", J. Mater. Chem. (Jun. 22, 2012), 23710-23725.
Y. C. Jeong et al., "Partially unzipped carbon nanotubes for high-rate and stable lithium-sulfur batteries", J. Mater. Chem. A (2016) 4, 819-826.

(Continued)

*Primary Examiner* — Cam N. Nguyen

(74) *Attorney, Agent, or Firm* — Bryan Cave Leighton Paisner LLP

(57) ABSTRACT

A activated carbon and a method for manufacturing the same are provided. The activated carbon comprises a carbon aggregate containing a plurality of linear carbons and has a specific surface area of 350 m²/g or more, and the method comprises pretreating a carbon aggregate precursor by ball milling and reacting the pretreated carbon aggregate precursor with $CO_2$.

4 Claims, 6 Drawing Sheets

(56)                  References Cited

FOREIGN PATENT DOCUMENTS

| | | | |
|----|----|----|----|
| KR | 10-2009-0074360 | A | 7/2009 |
| KR | 20090074360 | A | 7/2009 |
| KR | 10-2011-0044367 | A | 4/2011 |
| KR | 10-2012-0007322 | A | 1/2012 |
| KR | 10-2014-0018569 | A | 2/2014 |
| KR | 10-2015-0121572 | A | 10/2015 |
| KR | 10-2018-0017856 | A | 2/2018 |
| KR | 10-1836273 | B1 | 3/2018 |
| KR | 10-2019-0093960 | A | 8/2019 |
| WO | 2005028719 | | 3/2005 |
| WO | 2012081601 | | 4/2012 |
| WO | 2015/099195 | A1 | 3/2017 |

OTHER PUBLICATIONS

Gerard Tobias et al., "Purification and Opening of Carbon Nanotubes Using Steam", J. Phys. Chem. B (2006), 110, 45, 22318-22322.
Mohd Adib Yahya et al., "A brief review on activated carbon derived from agriculture by-product", AIP Conference Proceedings, 1972, 030023 (2018).
Ahn et al., "Structural modification of carbon nanotubes by various ball milling", Journal of Alloys and Compounds 434-435 (2007) 428-432.

* cited by examiner

Increase of activation effect according to BM

FIG. 2A

ACTIVATED CARBON AND METHOD FOR MANUFACTURING THE SAME

CROSS-REFERENCE TO RELATED APPLICATION(S)

The present application is a National Stage Application of International Application No. PCT/KR2021/017143, filed on Nov. 22, 2021, which claims the benefit of priority based on Korean Patent Application No. 2020-0159437 filed on Nov. 25, 2020, the disclosures of which are incorporated herein by reference in their entirety.

FIELD OF DISCLOSURE

The present disclosure relates to activated carbon and a method for preparing the same.

BACKGROUND

In general, activated carbon is widely used in various fields from daily life to industrial use due to its unique adsorption properties, and thus various methods for preparing activated carbon have been developed.

A method for preparing activated carbon is largely divided into a chemical activation method and a physical activation method.

The chemical activation method is a process of activating a carbon material by reacting with a basic material such as KOH, NaOH, $H_3PO_4$, $ZnCl_2$, etc. under high temperature and $N_2$ or Ar atmosphere to increase pores and specific surface area of the carbon material. However, the chemical activation method is cumbersome and may reduce process efficiency since basic salts and impurities must be removed after the reaction. In addition, there may be a risk of explosion due to the formation of metals such as K and Na during the reaction under the high temperature.

The physical activation method is a process of activating a carbon material by oxidizing it using a $CO_2/O_2$ mixture, or $O_2$ or $H_2O$ steam alone or in combination at a high temperature of 700° C. to 900° C. When oxidizing a carbon material, if only $CO_2$ is used, since the activation kinetic is very slow, $CO_2/O_2$ mixture, or $O_2$ or $H_2O$ steam should be used alone or in combination. In addition, the physical activation method has limitations in improving specific surface area and pore structure compared to the chemical activation method, and thus in the case of CNTs, it is known that it is difficult to improve specific surface area and pore structure by the physical activation method. In addition, there is a risk of explosion in that oxygen gas and steam are used at high temperature.

Therefore, in order to improve the efficiency of the activation process of carbon materials comprising CNTs and commercialize them, it is required to develop an activation process for carbon materials, which does not require a separate process for removing impurities and has no risk of explosion.

RELATED ARTS

Korean Patent Publication No. 2011-0044367
Korean Patent Publication No. 2014-0018569

SUMMARY

The present disclosure intends to provide activated carbon with improved specific surface area and pore structure through a process with improved stability and efficiency by solving the problems of the conventional activation method of carbon materials, and a method for preparing the same.

Therefore, it is an object of the present disclosure to provide activated carbon with improved specific surface area and pore structure.

It is another object of the present disclosure to provide a method for preparing activated carbon with improved stability and efficiency.

In order to achieve the above objects, the present disclosure provides an activated carbon which comprises a carbon aggregate comprising a plurality of linear carbons and has a specific surface area of 350 $m^2$/g or more.

The present disclosure also provides a method for preparing an activated carbon, the method comprising steps of (S1) pretreating a carbon aggregate precursor containing a number of linear carbons by ball milling; and (S2) activating the pretreated carbon aggregate precursor by reacting with $CO_2$.

The activated carbon according to the present disclosure can have minimized intrinsic decrease in electrical conductivity of a carbon material, while having increased specific surface area and porosity by the activation process.

In addition, since the method for preparing activated carbon according to the present disclosure can activate carbon by dry ball milling and a reaction process with $CO_2$ without using a separate chemical substance, thereby improving the safety and efficiency of the activation process.

BRIEF DESCRIPTION OF DRAWINGS

FIGS. 2A and 2B are a scanning electron microscope (SEM) photograph and a transmission electron microscopy (TEM) of activated carbon prepared in Example 1 and Comparative Example 1, respectively.

DETAILED DESCRIPTION

Figure 1A:
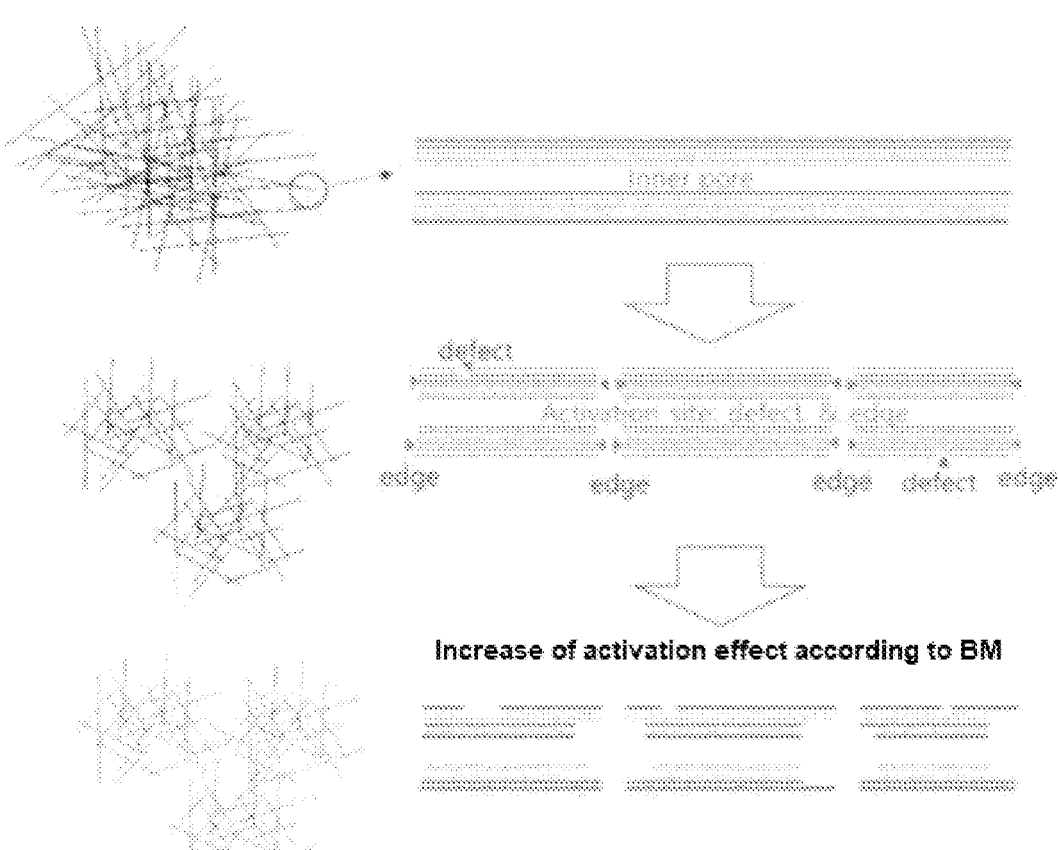
FIG. 1A is a schematic diagram showing the change in shape when ball milling the carbon aggregate precursor.

Hereinafter, the present disclosure will be described in more detail to help the understanding of the present disclosure.

As used herein, the term "carbon aggregate precursor" refers to a carbon material used as a raw material for the production of activated carbon, which is a carbon material in which linear carbons are entangled with each other to form an aggregated cotton ball-like shape.

As used herein, the term "carbon aggregate" refers to a carbon material contained in activated carbon, which is a carbon material activated after a carbon aggregate precursor containing linear carbons is subjected to a ball milling process and a plurality of cross sections are formed by frictional force between the linear carbons and balls. The carbon aggregate precursor containing the linear carbons has a shape like a cotton ball, and is not be released into strands when rubbed against the ball, and linear carbon may be broken and fractured in the middle, or a part of the surface of the linear carbon may be cut to form an edge.

As used herein, the term "cross section" refers to all ends formed by fracture of the carbon aggregate precursor by friction with a ball during ball milling, or edges formed on the surface of linear carbon by friction.

Activated Carbon

The present disclosure relates to an activated carbon with improved specific surface area and pore structure.

The activated carbon according to the present disclosure comprises a carbon aggregate containing a plurality of linear carbons, and has a specific surface area of 350 m$^2$/g or more.

When comparing a single carbon having the same specific surface area and a carbon aggregate, in the case of the single carbon, there is a problem that since it is bulky and light compared to the carbon aggregate, it is easily scattered and thus processability is not good. In particular, when applying the single carbon and carbon aggregate as a material for an electrode, there is a problem that single carbon consumes a lot of solvent when preparing the slurry, so that the solid content of the slurry is lowered and processability is deteriorated.

In the present disclosure, the carbon aggregate has a cotton ball-like shape in which linear carbons are entangled with each other. The linear carbons comprise one or more selected from the group consisting of carbon nanotube (CNT) and carbon fiber, but is not limited thereto as long as a plurality of linear carbons are entangled with each other to form an aggregate form.

In addition, the length of the linear carbon is 500 nm or more, and the cross sectional diameter is 2 nm to 100 nm. Specifically, the length of the linear carbon may be 500 nm or more, 600 nm or more, or 700 nm or more, and the upper limit of the length is not particularly limited, and may be 300 μm or less, 400 μm or less, or 500 μm or less. In addition, the cross sectional diameter of the linear carbon may be 2 nm or more, 5 nm or more, or 10 nm or more, and 80 nm or less, 90 nm or less, or 100 nm or less. The range of the length and cross sectional diameter of the linear carbon is set to an appropriate range that may form an aggregate well by entangling with each other.

If the length of the linear carbon is less than 500 nm, it may be difficult to form a carbon aggregate because the length is short, and even if the carbon aggregate is formed, it may be easily detached. If the length of the linear carbon exceeds 500 μm, since a carbon aggregate is also formed even by a small number of linear carbons, the number of cross sections of the linear carbon exposed on the surface of the carbon aggregate is also reduced, and thus the degree of improvement in the specific surface area may be insignificant.

In the present disclosure, cross sections of the linear carbons may be exposed on the surface of the carbon aggregate.

The cross section of the linear carbon is formed by rupture of the carbon aggregate precursor containing the linear carbon in the ball milling process by friction with the ball as will be described later.

By exposing the cross sections of the linear carbons on the surface of the carbon aggregate, it is possible to increase the specific surface area of the activated carbon comprising the carbon aggregate. As defined above, the term "cross section" of the linear carbon in the present specification refers to all ends formed by fracture of the carbon aggregate precursor by friction with a ball during ball milling, or edges formed on the surface of linear carbon by friction.

In the present disclosure, the activated carbon comprises amorphous carbon. The amorphous carbon may exhibit an effect of further increasing the specific surface area of activated carbon.

In general, amorphous carbon is formed in a carbon activation process, and thus amorphous carbon may be identified in activated carbon. For example, since carbon nanotubes are not activated well through a physical activation process, amorphous carbon may hardly be identified in carbon nanotubes even after the physical activation process.

However, if the amorphous carbon is excessively formed, it results in an increase in the degree of disorder inside the activated carbon, and thus electrical conductivity and mechanical strength may be reduced. As described above, since the amorphous carbon is related to the degree of disorder inside the activated carbon, the appropriate amount of the amorphous carbon is related to $I_D/I_G$, which will be described later.

In the present disclosure, the specific surface area of the activated carbon may be 350 m$^2$/g or more. Specifically, the specific surface area of the carbon aggregate may be 350 m$^2$/g or more, 450 m$^2$/g or more, or 550 m$^2$/g or more.

If the specific surface area of the activated carbon is less than 350 m$^2$/g, since there is no significant difference from the non-activated carbon material, the reactivity may be reduced when used as an electrode material. The upper limit of the specific surface area of the activated carbon is not particularly limited, but in consideration of the durability of the activated carbon, it may be 1000 m$^2$/g or less.

In addition, the total pore volume of the activated carbon may be 0.8 cm$^3$/g to 3.0 cm$^3$/g, and specifically, 0.8 cm$^3$/g or more, 1.0 cm$^3$/g or more, or 1.5 cm$^3$/g or more, and 2.5 cm$^3$/g or less, or 3.0 cm$^3$/g or less.

If the total pore volume of the activated carbon is less than 0.8 cm$^3$/g, since it is at the same level as carbon before activation, when applied as an adsorbent or electrode material, the amount of adsorption or storage capacity of lithium ions may be reduced. If the total pore volume of the activated carbon exceeds 3.0 cm$^3$/g, durability of the activated carbon may be reduced.

In addition, $I_D/I_G$, which is a parameter quantitatively indicating the degree of disorder or defect generation in the crystal structure of the activated carbon, may be 2.0 or less, and specifically, 2.0 or less, 1.5 or less, 1.3 or less, or 1.0 or less. The lower limit of $I_D/I_G$ is not particularly limited, but may be 0.5 or more. If $I_D/I_G$ is greater than 2.0, electrical conductivity and mechanical strength may be greatly reduced due to too many defects in the carbon structure. If $I_D/I_G$ is less than 0.5, it means that activation is not performed properly.

$I_D$ and $I_G$ may be measured and calculated using Raman spectroscopy, respectively, and $I_D$ is the maximum peak intensity in the range of 1310 cm$^{-1}$ or more and 1350 cm$^{-1}$ or less of the spectrum by Raman spectroscopy, and $I_G$ is the maximum peak intensity in the range of 1560 cm$^{-1}$ or more and 1600 cm$^{-1}$ or less of the spectrum by Raman spectroscopy.

In general, Raman spectroscopy is generally used to study the structure of a material using a special arrangement of light generated by the Raman effect.

A peak that exists in a region near a wave number of 1360 cm$^{-1}$ in the Raman spectrum is called a D band, and the D band is a peak representing the sp3 bond, and increases when the atomic bond formed by the sp2 bond is broken to form a sp3 bond.

In addition, a peak that exists in a region near a wave number of $1580 \ cm^{-1}$ in the Raman spectrum is called a G band, and the G band is a peak representing the sp2 bond, and means that there are no structural defects.

When a disorder or defect is generated in the structure of the material, since the D band is increased, the degree of generation of a disorder or defect can be quantitatively evaluated by calculating the ratio $(I_D/I_G)$ of the maximum peak intensity $(I_D)$ of the D band to the maximum peak intensity $(I_G)$ of the G band.

Activated carbon according to the present disclosure comprises a carbon aggregate comprising linear carbon, and has characteristics of a cotton ball shape in which the linear carbons are entangled with each other. Accordingly, the cross section generated by the breakage of linear carbon is exposed on the surface of the carbon aggregate, increasing the specific surface area, rather than causing defects on the surface of linear carbon by friction with balls in the ball milling process, and the electrical conductivity is also excellent, while increasing the porosity by activation, due to the morphological characteristics of linear carbon.

Since the activated carbon maintains the shape of carbon aggregate, when added to the electrode material or composite material, the amount of solvent required is small, and the volume and scattering properties are small, so that processing may be easy. In addition, since activated carbon of the shape of the carbon aggregate already has a cotton ball shape, it can prevent the phenomenon in which carbons are irregularly re-aggregated.

Method for Preparing Activated Carbon

The present disclosure also relates to a method for preparing activated carbon, and the method for preparing activated carbon comprises the steps of (S1) pretreating a carbon aggregate precursor containing a number of linear carbons by ball milling; and (S2) activating the pretreated carbon aggregate precursor by reacting with $CO_2$.

At this time, the carbon aggregate precursor refers to a structure in which linear carbons are entangled with each other to form a cotton ball shape. The type of the linear carbon is the same as described above.

In the present disclosure, in step (S1), the carbon aggregate precursor may be ball milled to prepare activated carbon having a uniform particle size and improved specific surface area.

In the ball milling process, the carbon aggregate precursor may be rubbed with the ball, and the linear carbon contained in the carbon aggregate precursor may be ruptured to generate multiple cross sections. Since the carbon aggregate precursor has the same shape as a cotton ball, a portion in friction with the ball may be broken to form a cross section such as an end and a surface edge, rather than releasing the linear carbons into strands when rubbing against the ball. In addition, since the carbon aggregate precursor has elasticity like a spring, changes in physical shape such as being pressed by the ball milling process can be minimized, and since friction with the ball occurs in all xyz directions, it is less likely to cause deformation of the shape in a specific direction.

Figure 1B:
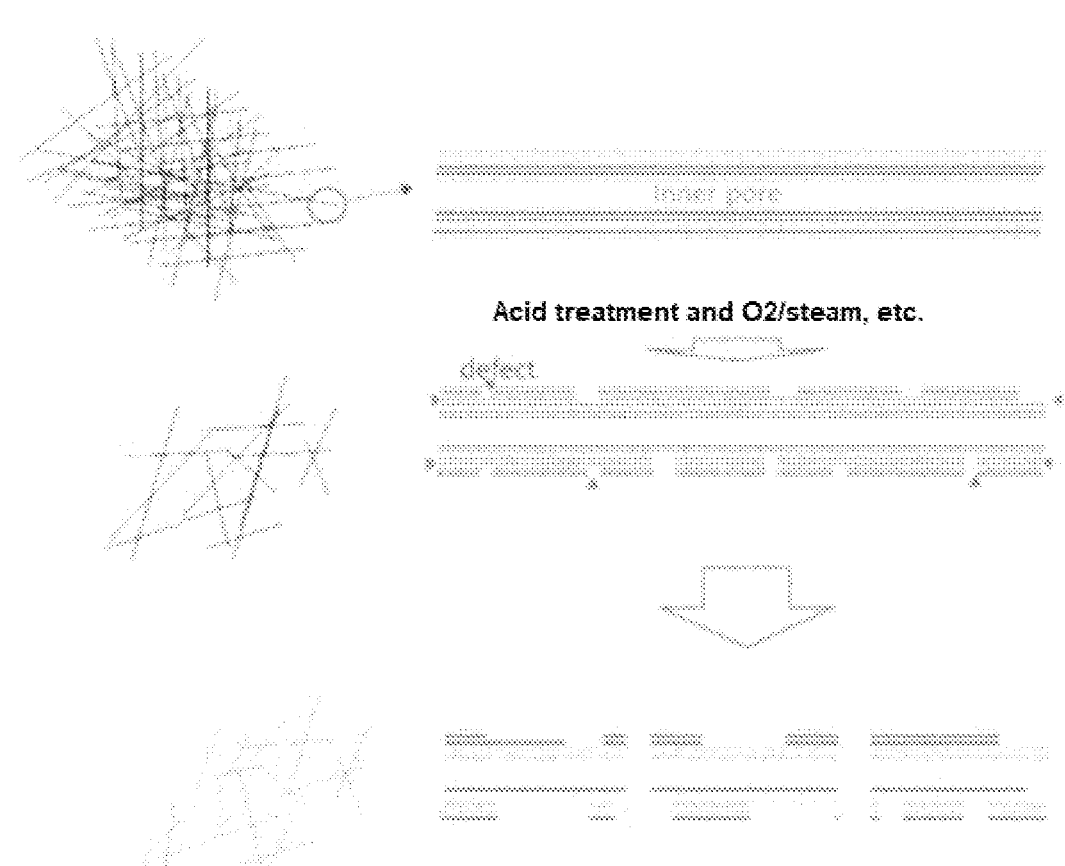
FIG. 1B is a schematic diagram showing the change in shape when chemically treating the carbon aggregate precursor.

FIG. 1A is a schematic diagram showing the change in shape when ball milling the carbon aggregate precursor, and FIG. 1B is a schematic diagram showing the change in shape when chemically treating the carbon aggregate precursor.

As shown in FIG. 1A, in the case of ball milling (BM) the carbon aggregate precursor, some defects also occur on the surface, but only some, and the carbon aggregate precursor may be rubbed against the ball and fractured, so that a number of edges are generated, thereby increasing the specific surface area.

On the other hand, as shown in FIG. 1B, when the carbon aggregate precursor is acid-treated or $O_2$/steam-treated, a surface defect is mostly generated. As such, if a large number of defects occur, there is a problem that since $I_D/I_G$ is greatly increased and resistance to electron movement through sp2 carbon is greatly increased, the electrical conductivity is lowered.

Accordingly, in the ball milling process, type, temperature, pressure, humidity, weight ratio of the milling balls and the carbon aggregate precursor, material of balls, etc. can be defined, in order to maximize friction between the ball and the carbon aggregate precursor.

The ball milling may be dry ball milling. That is, the dry ball milling causes the carbon aggregate precursor itself to friction with the balls, and does not use a separate solvent during the ball milling process. The dry ball milling may improve the friction force between the ball and the carbon aggregate precursor compared to the wet ball milling, and accordingly, the number of cross sections formed on the carbon aggregate precursor may be increased, thereby further improving the specific surface area. In addition, if a dry ball milling process is introduced, it has the advantage that there are no problems such as wastewater generated while removing solvent in wet ball milling, or the time to remove the solvent, and the coffee ring effect that occurs while removing the solvent.

In addition, the ball milling may be performed under the conditions of room temperature and atmospheric pressure, and in this case, there is an advantage that it is possible to improve the friction force between the ball and the carbon aggregate precursor. In this case, the room temperature may be 0° C. or more, or 25° C. or more, and 60° C. or less, or 100° C. or less. The atmospheric pressure may be 0.5 atm or more, or 0.8 atm or more, and 1.3 atm or less, or 2 atm or less. For example, the room temperature and atmospheric pressure may be 25° C. and 1 atm.

In addition, the ball milling may be performed under a humidity of 30% to 70%, and specifically, the humidity may be 30% or more, 40% or more, or 45% or more, and 55% or less, 60% or less, or 70% or less. If the humidity is less than 30%, the pulverization force may be reduced due to agglomeration due to electrostatic force generated from friction. If the humidity exceeds 70%, structural deformation of the carbon aggregate may occur due to moisture.

In addition, the ball milling process may be performed for 0.5 to 50 hours under milling conditions of 100 to 400 RPM using a milling ball having a diameter of 1 to 10 mm.

In addition, the ball milling may be performed under the condition that a weight ratio of the carbon aggregate precursor to the milling ball is 1:1 to 100:1, and specifically, the weight ratio may be 1:1 or more, 10:1 or more, 20:1 or more, or 30:1 or more, and 70:1 or less, 80:1 or less, 90:1 or less, or 100:1 or less. If the weight ratio is less than 1:1, the cross section of the carbon aggregate precursor may be excessively formed, and durability may be poor. If the weight ratio is more than 100:1, the carbon aggregate precursor is used in excess, and the effect of increasing the specific surface area may be insignificant.

In addition, the milling balls may be zirconia ($ZrO_2$) balls or alumina ($Al_2O_3$) balls, and preferably, zirconia balls may be used in consideration of frictional force with the carbon aggregate precursor.

Through this ball milling process, the carbon aggregate precursor may be pulverized to have a uniform particle size, and a number of cross sections may be formed on the carbon aggregate precursor to significantly improve the activation kinetic in step (S2) as described below.

In the present disclosure, in step (S2), the carbon aggregate precursor pretreated in step (S1) may be reacted with $CO_2$ to activate the same.

Since the pretreated carbon aggregate precursor has a number of cross sections formed on the surface by friction with the balls during ball milling and thus has an increased specific surface area, the pretreated carbon aggregate precursor is activated by reacting with $CO_2$, which can significantly improve the activation kinetic.

The reaction of the carbon aggregate precursor and $CO_2$ may be performed under active atmosphere to increase the reactivity of the cross section formed on the surface of the carbon aggregate precursor and $CO_2$, and thus improving activation efficiency.

In addition, the activation may be performed under one or more reducing gases selected from the group consisting of carbon monoxide, oxygen, hydrogen, ethylene, ethane and methane, and the activation process may be performed by partially mixing an inert gas such as nitrogen or argon, in order to prevent excessive activation.

In addition, the activation may be performed by heat treatment after increasing the temperature.

It may be good in terms of activation efficiency to perform the activation while gradually increasing the temperature. By controlling the temperature increasing rate, the carbon aggregate can be activated uniformly overall, and if the temperature increasing rate is extremely fast, non-uniform activation may occur. In this case, the temperature increasing rate may be 1° C./min to 10° C./min, and specifically, 1° C./min or more, 2° C./min or more, or 3° C./min or more, and 8° C./min or less, 9° C./min or less, or 10° C./min or less. If the temperature increasing rate is less than 1° C./min, since the temperature increasing rate is too slow, it is activated excessively in the activation temperature range, and mechanical and/or electrical properties may be deteriorated. If the temperature increasing rate is more than 10° C./min, the temperature increasing rate is too fast, non-uniform activation may be obtained.

After increasing the temperature, it may be heat-treated at a temperature of 900° C. to 1200° C. Specifically, the heat treatment temperature may be 900° C. or more, 1000° C. or more, or 1050° C. or more, and 1100° C. or less, 1150° C. or less, or 1200° C. or less. If the heat treatment temperature is less than 900° C., the reactivity of the carbon aggregate precursor and $CO_2$ is lowered, so that the activation efficiency is not good. If the heat treatment temperature is more than 1200° C., the carbon aggregate is oxidized, and mechanical/electrical strength and yield may be greatly reduced.

The heat treatment time is not particularly limited, but in consideration of activation efficiency, may be 1 hour or more, or 2 hours or more, 5 hours or less, 7 hours or less, or 10 hours or less.

In addition, the activation step may be performed in a fluidized bed reactor for a uniform reaction, and for example, the fluidized bed reactor may be a tube furnace or a box furnace.

If the fluidized bed reactor is used, since more uniform activation is possible, the specific surface area of the activated carbon particles can be increased evenly, and the pulverization of the activated carbon particles can also be prevented.

Hereinafter, preferred Examples are presented to help understanding of the present disclosure. However, it will be apparent to those skilled in the art that following Examples are merely illustrative of the present disclosure, and various changes and modifications are possible within the scope and spirit of the present disclosure, and it goes without saying that such changes and modifications fall within the scope of the appended claims.

Example 1

(1) Pretreatment Using Ball Milling

A carbon aggregate precursor (FT series, Canon company, hereinafter referred to as CNT1) in which a number of CNTs are entangled was pretreated by a ball milling process under conditions of 25° C., 1 atm and 50% humidity. The ball milling process was performed for 1 hour under the milling condition of 300 rpm, using a zirconia ball with a diameter of 3 mm. In addition, the weight ratio of the carbon aggregate precursor and the ball was set to 50:1 (BM.CNT1).

In the CNT1, the number of CNT walls is 9.

(2) Activation Through Reaction with $CO_2$

Using a fluidized bed reactor, the pretreated carbon aggregate precursor was activated by reacting with $CO_2$. At this time, the activation was performed at 950° C. for 3 hours by heat-treatment at a temperature of 950° C., after increasing the temperature for 3 hours at a rate of 5° C./min, thereby preparing activated carbon (Act.BM.CNT1).

Comparative Example 1

Activated carbon was prepared in the same manner as in Example 1, except that a non-pretreated carbon aggregate precursor (CNT1) is heat-treated at a temperature of 650° C. (Act.CNT1).

Example 2

Pretreated carbon aggregate precursor (BM.CNT2) and activated carbon (Act.BM.CNT2) were prepared in the same manner as in Example 1 using ball milling, except that a carbon aggregate precursor (FT series, Canon company, hereinafter referred to as CNT2) with different number of walls, diameter and length of carbon nanotube compared to the carbon aggregate precursor (FT series, Canon company, CNT1) in which a number of CNTs are entangled are used In the CNT2, the number of walls of the CNT is 6, and thus since the number of walls is smaller than that of CNT1, the diameter is also relatively small.

Comparative Example 2

Activated carbon was prepared in the same manner as in Example 2, except that the untreated carbon aggregate precursor (CNT2) was heat-treated at a temperature of 650° C. (Act.CNT2).

Experimental Example 1: Analysis of Shape and Particle Size

The shape and particle size of activated carbon prepared in Example 1 and Comparative Example 1, respectively, were analyzed.

The shape of activated carbon was analyzed using a scanning electron microscope (SEM, JSM7610F, JOEL company) and a transmission electron microscopy (TEM, JEM1400FLASH, JOEL company).

Figure 2A:
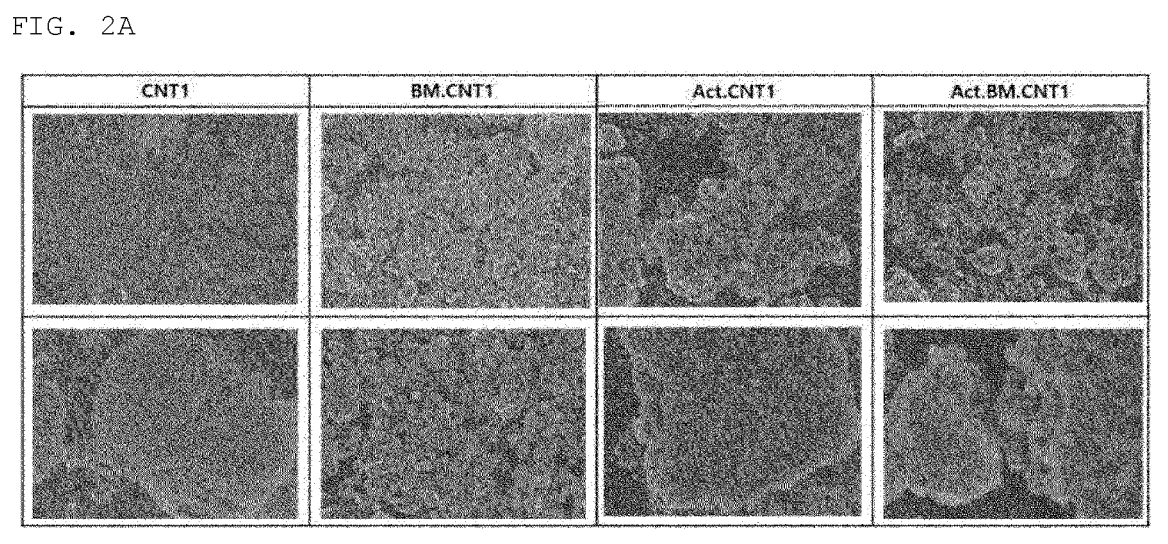
Figure 2B:
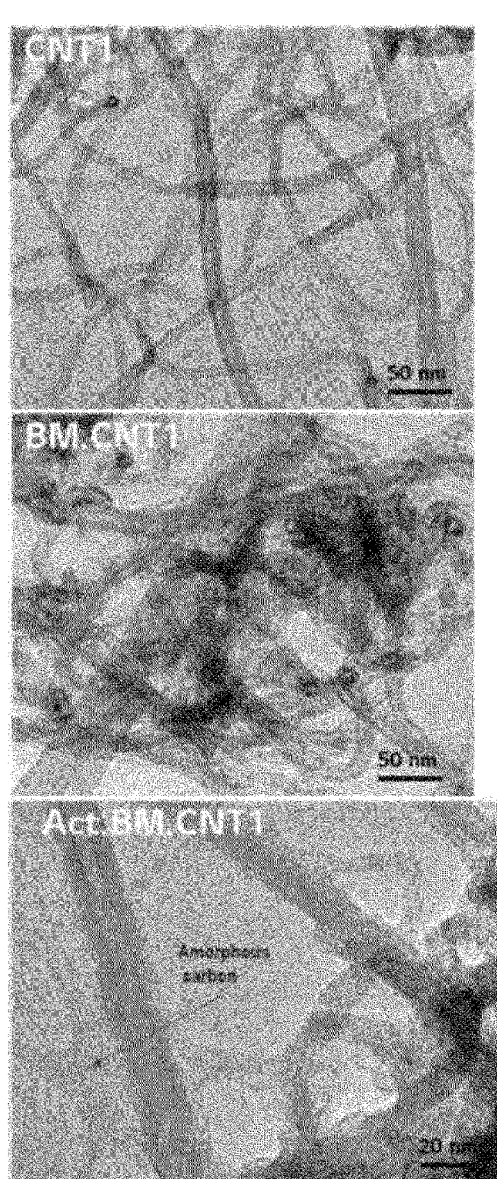

FIG. 2A is a SEM photograph of a carbon aggregate precursor (CNT1), which is a raw material, a carbon aggregate precursor pretreated using ball milling (BM.CNT1), activated carbon activated by reacting with $CO_2$ without pretreatment in Comparative Example 1 (Act.CNT1), and activated carbon activated by reacting with $CO_2$ after pretreatment in Example 1 (Act.BM.CNT1), and FIG. 2B is a TEM photograph.

As shown in FIG. 2A, it can be seen that the activated carbon (Act.BM.CNT1) of Example 1 has a fine and uniform shape, and maintains the shape of the aggregate formed by entangled linear carbon.

On the other hand, it can be seen that the activated carbon (Act.CNT1) of Comparative Example 1 did not change significantly in size compared to the carbon aggregate precursor (CNT1) used as a raw material.

Also, as shown in FIG. 2B, it can be seen that in the case of Example 1 activated carbon (Act.BM.CNT1), more amorphous carbon (amorphous carbon) was formed. Since the amorphous carbon is confirmed, it can be seen that activation was well achieved. In addition, due to the amorphous carbon, an effect of increasing a specific surface area may also appear.

The particle size of activated carbon was analyzed using a particle size analyzer (Bluewave, Microtrac company), and the results are shown in Table 1 and FIG. 3 below.

TABLE 1

| Unit: μm | | Mw | D10 | D50 | D90 | D95 | D99 |
|---|---|---|---|---|---|---|---|
| Example 1 | CNT1 | 155.4 | 19.49 | 115 | 319.4 | 353.3 | 449.7 |
| Example 1 | BM.CNT1 | 15.77 | 2.09 | 7.27 | 25.74 | 66.5 | 178.7 |
| Comparative Example 1 | Act.CNT1 | 147.5 | 21.76 | 108.7 | 301.5 | 336.1 | 425.4 |
| Example 1 | Act.BM.CNT1 | 10.56 | 2.15 | 6.66 | 24.12 | 35.05 | 59.19 |

Figure 3:
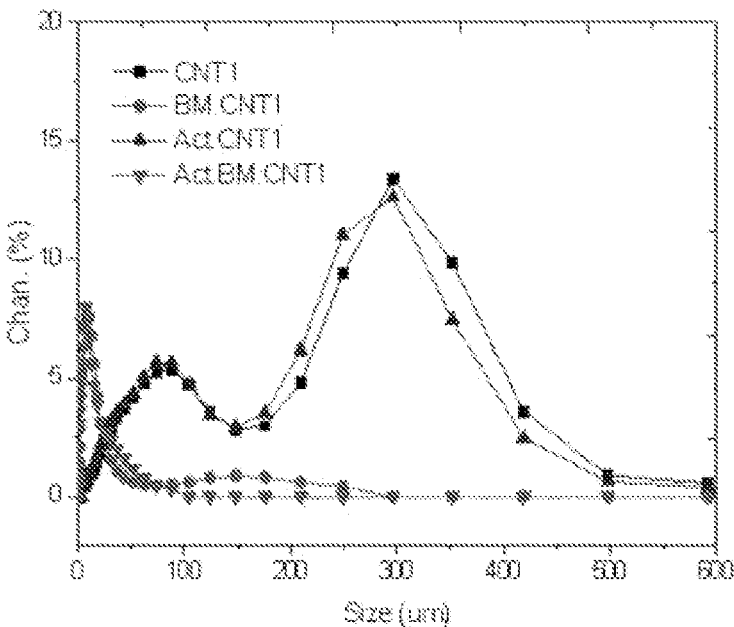
FIG. 3 is a graph showing the results of particle size analysis of activated carbon prepared in Example 1 and Comparative Example 1.

As shown in Table 1 and FIG. 3, it can be seen that the particle size of activated carbon (Act.BM.CNT1) in Example 1 is significantly smaller than that of the carbon aggregate precursor (CNT1) which is a raw material.

On the other hand, it can be seen that the particle size of activated carbon (Act.CNT1) of Comparative Example 1 did not change significantly compared to the carbon aggregate precursor (CNT1).

Experimental Example 2: Analysis of Specific Surface Area

The specific surface area of activated carbon prepared in Examples 1 and 2 and Comparative Examples 1 and 2, respectively, was analyzed.

The specific surface area of the activated carbon was analyzed using a Brunauer-Emmett-Teller (BET) analyzer (ASAP 2020, Micrometrics Inc.), and the results are shown in Table 2 and FIGS. 4A and 4B below.

TABLE 2

| Unit: μm | | Specific surface area (m²/g) |
|---|---|---|
| Example 1 | CNT1 | 217.18 |
| Example 1 | BM.CNT1 | 223.12 |
| Comparative Example 1 | Act.CNT1 | 298.44 |
| Example 1 | Act.BM.CNT1 | 455.67 |
| Example 2 | CNT2 | 309.95 |
| Example 2 | BM.CNT2 | 302.07 |

TABLE 2-continued

| Unit: μm | | Specific surface area (m²/g) |
|---|---|---|
| Comparative Example 2 | Act.CNT2 | 429.54 |
| Example 2 | Act.BM.CNT2 | 501.11 |

Figure 4A:
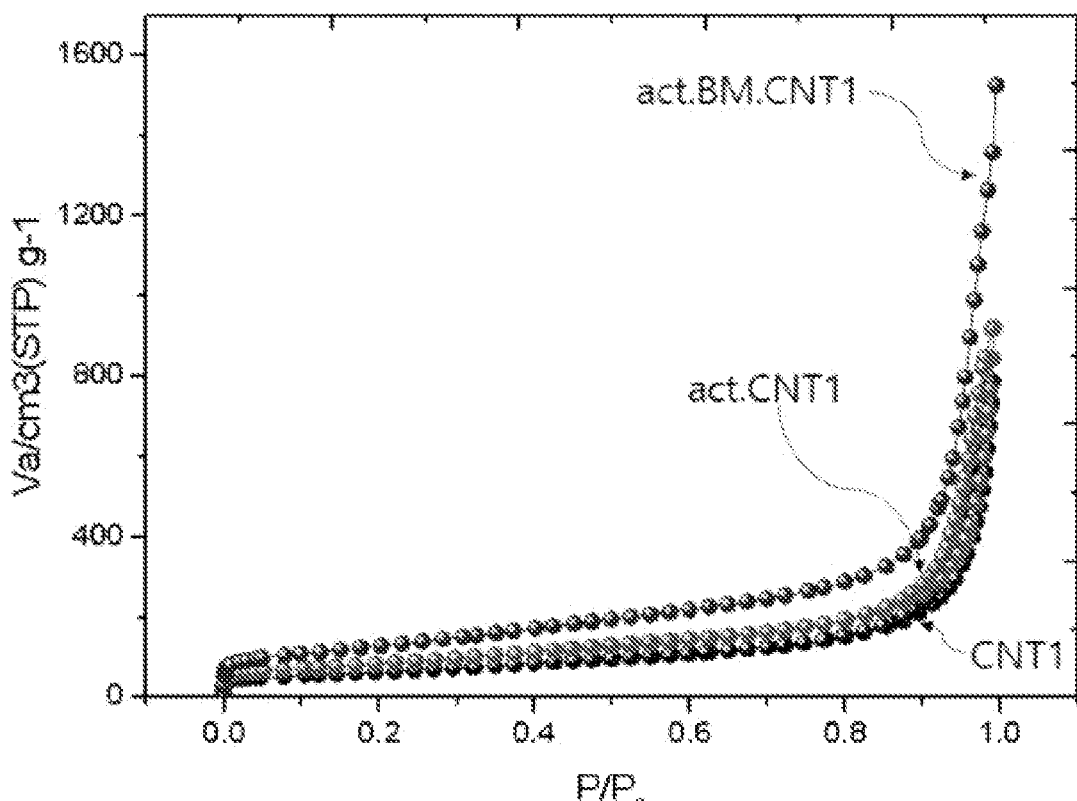
FIGS. 4A and 4B are graphs showing measurement results of specific surface area of activated carbon prepared in Examples 1 and 2 and Comparative Examples 1 and 2.
Figures 4B, 5:
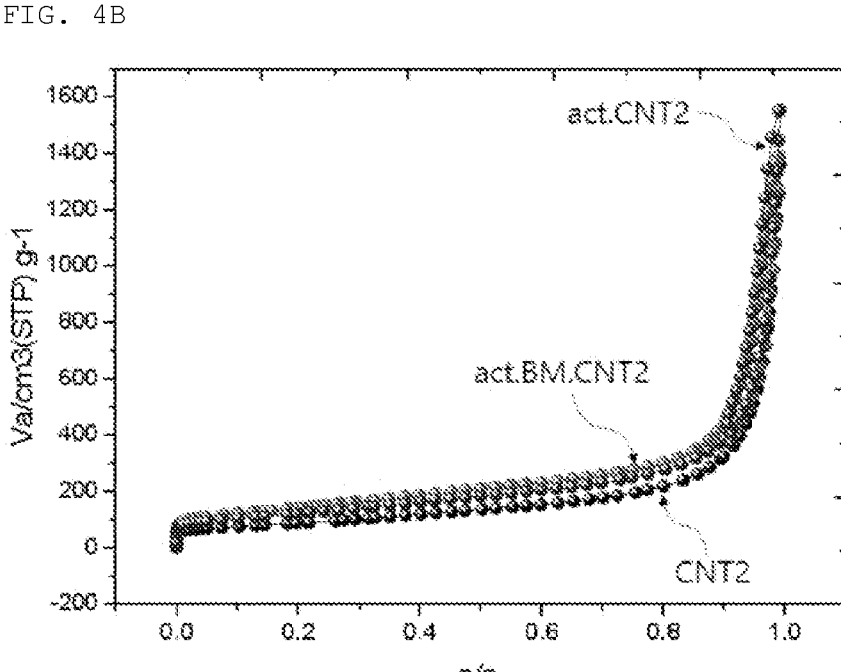
FIG. 5 is a graph showing the analysis result of the powder resistance of activated carbon prepared in Example 1.

As shown in Table 2 and FIGS. 4A and 4B, it can be seen that the specific surface area of the activated carbon of Example 1 (Act.BM.CNT1) and Example 2 (Act.BM.CNT2) was significantly increased compared to the carbon aggregate precursor (CNT1, CNT2) which is a raw material.

In addition, it can be seen that since CNT1 in Example 1 has a relatively large diameter due to the larger number of walls compared to CNT2 in Example 2, and generally also has a decreased mechanical strength due to the increase in the number of walls of CNT, the effect of increasing the specific surface area by ball milling and activation is also about 210% in Example 1 compared to Comparative Example 1, which is more effective than the increase of about 160% in Example 2.

Although activated carbon of Comparative Example 1 (Act.CNT1) and Comparative Example 2 (Act.CNT2) also had an increased specific surface area compared to the carbon aggregate precursor (CNT1, CNT2), the increase in specific surface area was relatively insignificant compared to Example 1 and Example 2.

Experimental Example 3: Analysis of Crystallinity

The crystallinity of activated carbon prepared in Example 1 and Comparative Example 1, respectively, was analyzed.

For crystallinity of the activated carbon, the ratio R value) of the maximum peak intensity ($I_D$) of the D band at $1360\pm50$ cm$^{-1}$ relative to the maximum peak intensity ($I_G$) of the G band at $1580\pm20$ cm$^{-1}$, which are obtained by Raman spectroscopy [using DXR Raman Microscope (Thermo Electron Scientific Instruments LLC)], and the results are shown in Table 3 below.

$I_D/I_G$ above means that the larger the value is, the more disorder or defects in the crystal are formed.

TABLE 3

| Unit: μm | | $I_D/I_G$ |
|---|---|---|
| Example 1 | CNT1 | 0.96 |
| Example 1 | BM.CNT1 | 0.97 |
| Comparative Example 1 | Act.CNT1 | 1.11 |
| Example 1 | Act.BM.CNT1 | 1.15 |

As shown in Table 3, it can be seen that since $I_D/I_G$ of activated carbon (Act.BM.CNT1) prepared in Example 1 did not increase significantly compared to the carbon aggregate precursor (CNT1) which is a raw material, the internal disorder or defect is not significantly increased by the activation process including ball milling and reaction with $CO_2$.

Experimental Example 4: Analysis of Powder Resistance

The powder resistance was analyzed for the activated carbon prepared in Example 1.

Using a powder resistance equipment (Loresta-GX company, MCP-PD51) equipment, 0.5 g of the sample was filled in a sample holder, and pressurized to 400 kgf, 800 kgf, 1200 kgf, 1600 kgf, or 2000 kgf, and then the conductivity at 60 MPa was measured.

As shown in FIG. 5, it can be seen that activated carbon (Act.BM.CNT1) prepared in Example 1 has no significant difference in conductivity compared to a carbon aggregate precursor (CNT1) which is a raw material.

From this, it was confirmed that according to the present disclosure, it is possible to prepare activated carbon in which electrical conductivity is not significantly reduced, while greatly increasing the specific surface area of the carbon aggregate precursor itself, which is a raw material, and making the particle size uniform and small.

In the above, although the present disclosure has been described by way of limited embodiments and drawings, the present disclosure is not limited thereto, and it is apparent to those skilled in the art that various modifications and variations can be made within the equivalent scope of the technical spirit of the present disclosure and the claims to be described below.

The invention claimed is:

1. An activated carbon comprising a carbon aggregate containing a plurality of linear carbons and having a specific surface area of 350 $m^2$/g or more, wherein cross sections of the linear carbons are exposed on a surface of the carbon aggregate, wherein $I_D/I_G$ of the activated carbon is 2.0 or less, and wherein $I_G$ is a maximum peak intensity in the range of vibration frequencies from 1560 $cm^{-1}$ to 1600 $cm^{-1}$ measured by Raman spectroscopy, and Ip is a maximum peak intensity in the range of vibration frequencies from 1310 $cm^{-1}$ to 1350 $cm^{-1}$ measured by Raman spectroscopy.

2. The activated carbon according to claim 1, wherein the linear carbons comprise one or more selected from the group consisting of carbon nanotube (CNT) and carbon fiber.

3. The activated carbon according to claim 1, further comprising an amorphous carbon.

4. The activated carbon according to claim 1, wherein a pore volume of the activated carbon is 0.8 $cm^3$/g to 3.0 $cm^3$/g.

\* \* \* \* \*